July 4, 1950  P. P. RATIE, SO-CALLED RATIER ET AL  2,514,166
DEVICE FOR SIMULTANEOUSLY CONTROLLING
THE CHANGE OF PITCH OF TWO PROPELLERS
Filed Aug. 14, 1945                                         4 Sheets-Sheet 2

INVENTORS
PIERRE PAUL RATIE, SO-CALLED RATIER
AND
RENE JEAN RATIE, SO-CALLED RATIER
BY Haseltine, Lake & Co.
Attorneys July 4, 1950   P. P. RATIE, SO-CALLED RATIER ET AL   2,514,166
DEVICE FOR SIMULTANEOUSLY CONTROLLING
THE CHANGE OF PITCH OF TWO PROPELLERS
Filed Aug. 14, 1945                                     4 Sheets-Sheet 3

INVENTORS
PIERRE PAUL RATIE, SO-CALLED RATIER AND
RENE JEAN RATIE, SO-CALLED RATIER
BY Haseltine, Lake & Co.
Attorneys

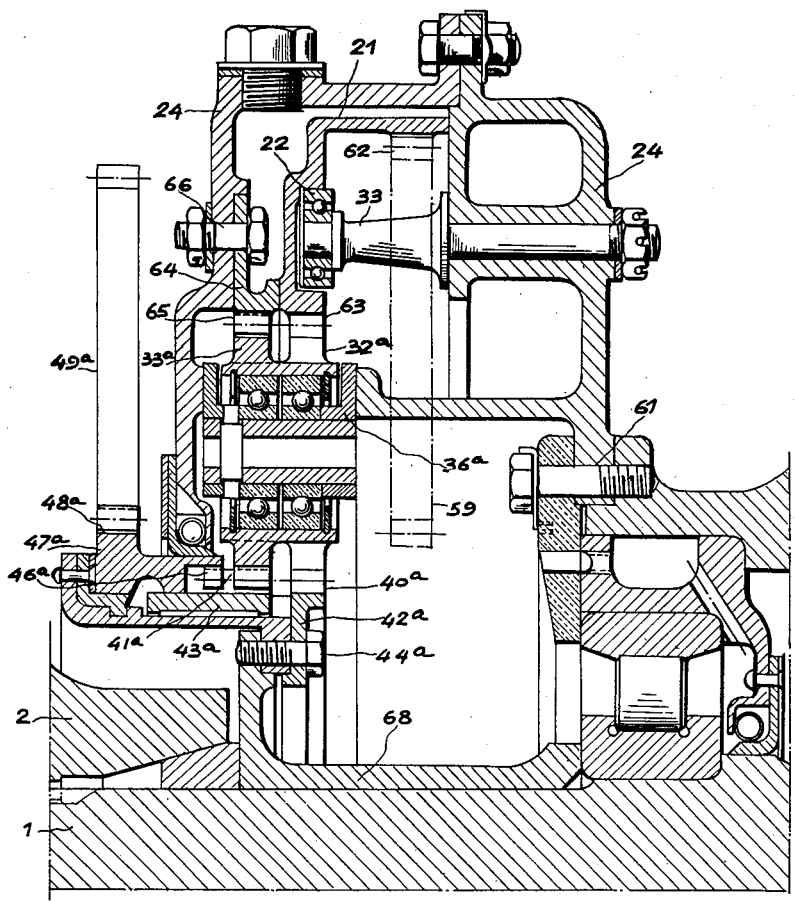

Patented July 4, 1950

2,514,166

UNITED STATES PATENT OFFICE 2,514,166

DEVICE FOR SIMULTANEOUSLY CONTROLLING THE CHANGE OF PITCH OF TWO PROPELLERS

Pierre Paul Ratié, so-called Ratier, and René Jean Ratié, so-called Ratier, Figeac, France Application August 14, 1945, Serial No. 610,810
In France August 20, 1941

Section 1, Public Law 690, August 8, 1946
Patent expires August 20, 1961

5 Claims. (Cl. 170—135.27)

1

The present invention relates to a device for simultaneously operating the pitch controlling mechanism of two propellers, in particular of two coaxial propellers, rotating in reverse directions.

The present invention more particularly relates to propellers of the kind having the blades rotatively mounted in radial hub sockets, the control being effected by means of worms engaging worm wheels rigidly secured on the roots of the blades.

The device, according to the invention, comprises, in a general manner, a primary propeller located at the front of the driving hub provided with any suitable device, such as a set of planet pinions, for varying the pitch of its blades, a secondary propeller shaft located between said primary propeller and the engine provided with similar pitch varying device, worms actuating said secondary pitch varying device, and an extension of said worms to actuate simultaneously the primary varying device.

The set of planet pinions or the like can be of any known type normally used in pitch controlling mechanism of single propellers.

A particular object of the invention is to provide the operation of the pitch controlling mechanism actuating the secondary propeller by means of an electric motor which acts, when varying said pitch, on a set of planet pinions of the epicyclic type or the like for producing the required angular displacement of the worms controlling said secondary propeller, said worms acting simultaneously on the set of planet pinions or like device provided on the primary propeller to actuate the pitch controlling worm of said primary propeller.

In these conditions, a single electric motor simultaneously operates the pitch controlling mechanism of both propellers.

The invention also includes other particular points which will become apparent from the following disclosure given with reference to the accompanying drawings, by way of example only, in which.

2

Figure 1:
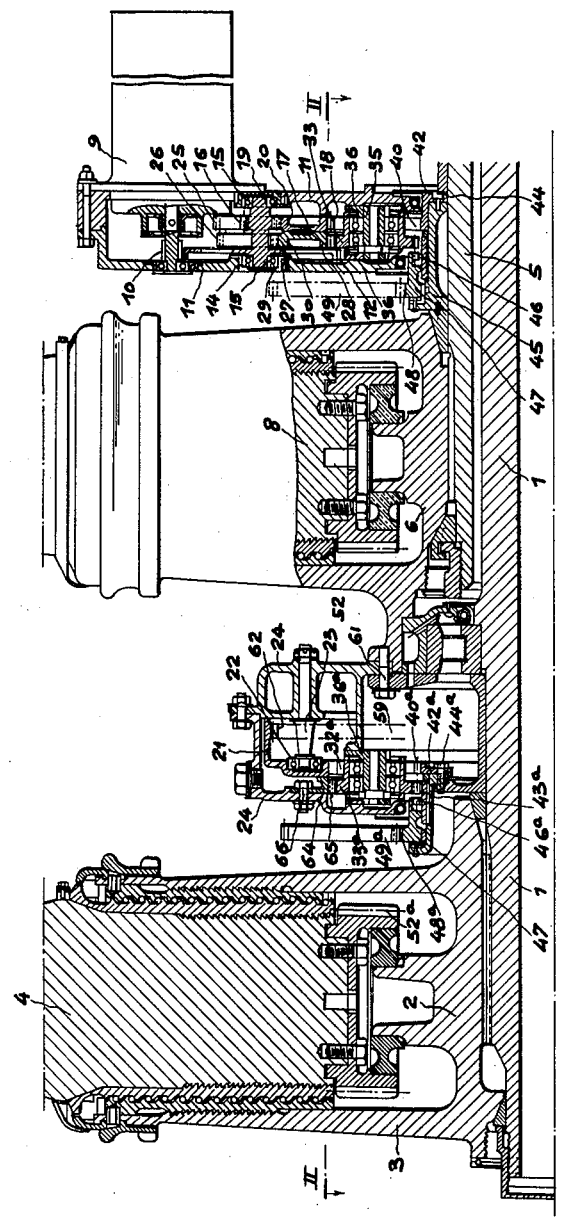
Fig. 1 is an elevational half-section of an operative device for the pitch controlling mechanisms of co-axial propellers.
Figure 2:
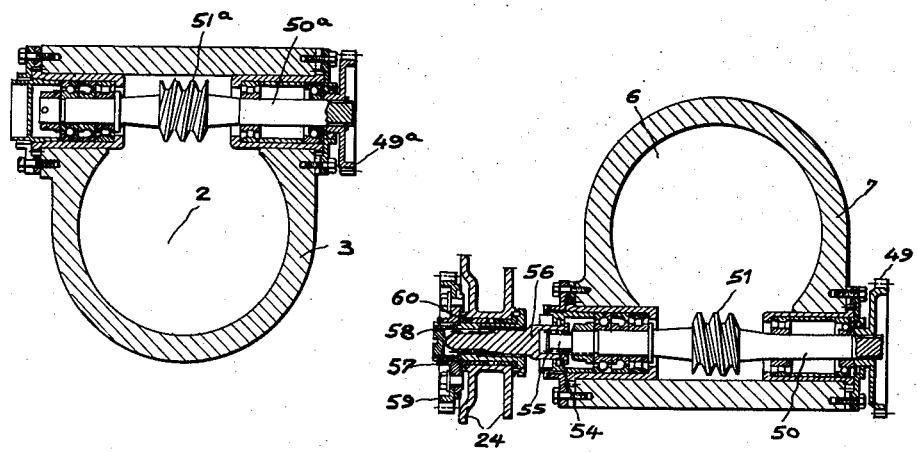
Fig. 2 is a transverse section on line II—II of the Figure 1.
Figure 4:
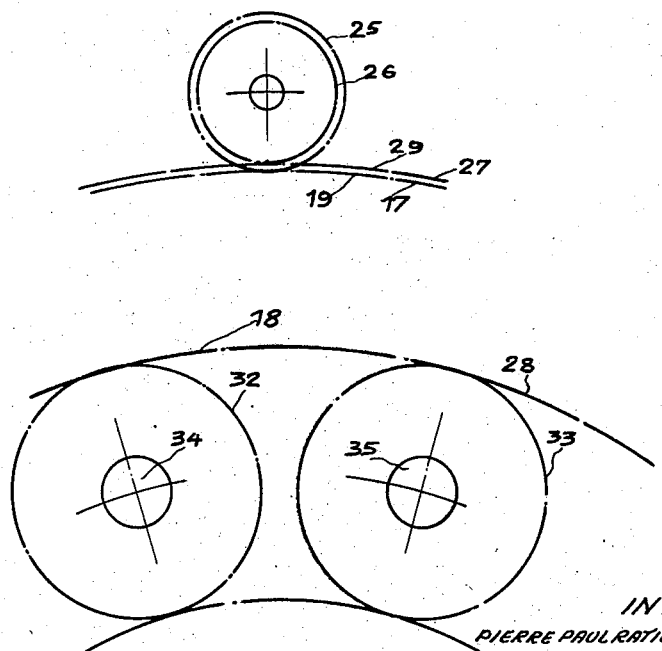
Fig. 4 is a diagrammatic front view corresponding to the Figure 3.
Figure 3:
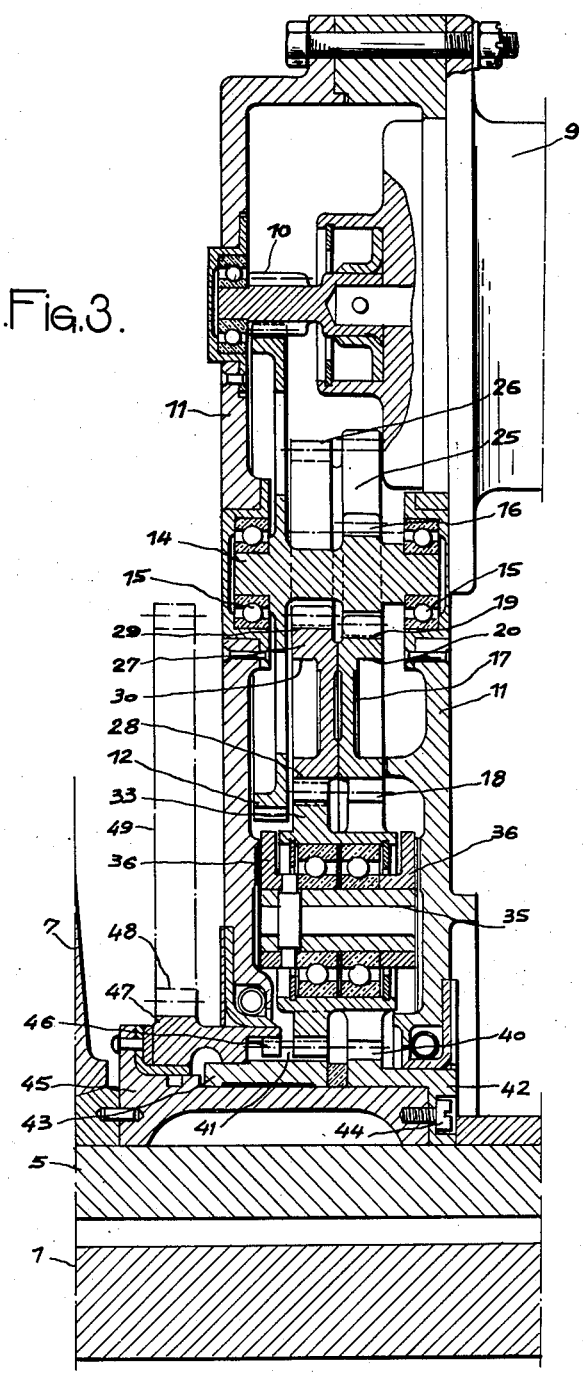
Fig. 3 is an enlarged view of an elevational section showing the epicyclic device controlling the rear or secondary propeller.

Fig. 5 is an enlarged view of an elevational section showing the epicyclic device controlling the front or primary propeller.

In the embodiment illustrated, on the front end of a primary shaft 1 is rigidly secured a front hub 2 provided with radial sockets 3 in which are rotatively mounted the blade roots 4 of the primary propeller.

Coaxially with the primary shaft and surrounding the latter along a certain distance, is provided a secondary tubular shaft 5 carrying, rigidly secured thereon, a rear hub 6 provided with radial sockets 7 in which are rotatively mounted the blade roots 8 of the secondary propeller.

The pitch variation of the secondary propeller is effected, in the ordinary manner, under the control of an electric motor 9 operating, by means of a driving pinion 10 keyed on the shaft of said motor, a set of epicyclic gears located within a stationary casing 11 supporting the electric motor 9.

The pinion 10 is permanently engaged with a spur wheel 12 rigidly fitted on a shaft 14 journaling into ball bearings 15 mounted in the two-part casing 11. An enlarged part of said shaft 14 forms a pinion 16 and engages the external teeth 19 of a ring gear 17 comprising integrally said external teeth and internal teeth 18. Ring gear 17 is held in position by a set of rollers, not shown, freely journaling upon stationary shafts and which bear on a race 20 provided in said ring gear. A similar assembly is illustrated at the left-hand side of Fig. 1 or in Fig. 5 for a movable ring gear 21 held in position and centered by rollers 22 the number of which is at least three and which are journaling on stationary shafts 23 secured on casing 24.

When ring gear 17 is angularly moved, its external teeth 19 transmit said movement to a loose pinion 25 associated with another loose connecting pinion 26 having a teeth number equal to the one of loose pinion 25. Said loose pinion 26 engages the external teeth 29 of another ring gear 27 comprising integrally said external teeth and internal teeth 28. The connection of ring gears 17 and 27 is thus ensured by twin pinions 25 and 26 engaging their external teeth 19 and 29 differently toothed.

Ring gear 27 is centered and held in position, as heretofore indicated for ring gears 17 and 21, by a set of rollers journaling upon stationary shafts and which bear on a race 30 provided in said ring gear 27.

Internal teeth 18 and 28 of ring gears 17 and 27 are permanently and respectively engaged with planet pinions 32 and 33 freely journaling on shafts 34 and 35 by means of ball bearings. Spindles 34 and 35 are mounted between flanges 36 held together by spacers so as to constitute a planet pinion carrier loosely mounted.

Planet pinions 32 and 33 respectively engage external teeth 40 and 41 of ring gears 42 and 43.

Ring gear 42 is rigidly secured on secondary shaft 5 by means of screws 44 and ring 45.

Ring gear 43 is loosely mounted and its teeth 41 also engage internal teeth 46 of ring gear 47 provided with external teeth 48 permanently in mesh with pinions 49 keyed on shafts 50. Each shaft 50, which is journaled in the corresponding socket 7 of hub 6, has a part forming a worm to control worm wheel 52 rigidly secured on root 8 of the corresponding blade.

The device heretofore described operates as follows:

Electric motor 9 operating the pitch controlling mechanism being stopped, pinion 10 is stationary as well as pinion 12, shaft 14 and pinion 16.

In these conditions, ring gear 17, engaging pinion 16, is stationary, also, pinions 25 and 26 connecting said ring gear 47 to ring gear 27 which latter is consequently held stationary.

The revolving displacements of planet pinions 32 and 33 are the same, there is therefore no pitch variation as, on the one hand, teeth 40 and 41 of ring gears 42 and 43 are equal in number and, on the other hand, planet pinions 32 and 33 are the same as well as internal teeth 18 and 28 of ring gears 17 and 27. Consequently there is no pitch variation of the blades, ring gear 43 assuming no relative angular displacement with respect to ring gear 42.

The circuit of operating electric motor 9 being closed, pinion 10 is rotatively driven and transmits its movement by pinion 12, shaft 14, pinion 16, ring gear 17 and pinions 25 and 26, to ring gear 27 which latter is thereby subjected to a relative angular displacement with respect to ring gear 17 in consequence of their different external teeth. The rotation of planet pinions 32 and 33 is modified, and as ring gear 42 is rigidly secured on shaft 5, ring gear 43 is angularly moved relative to crown wheel 42. This relative angular displacement of ring gear 43 causes a relative angular displacement of ring gear 47 and consequently of pinion 49 controlling worm 51, thus effecting the pitch variation of the secondary propeller.

The device previously described is known per se, and is similar to that used for single propellers.

According to the invention, worm shaft 50 operating the pitch variation of the secondary propeller are extended forward by a splined portion 54 engaged in a corresponding part 55 of a shaft 56. Each shaft 56 is rendered angularly rigid by means of splines 57, with a corresponding shaft 58 on which a pinion 59 is rigidly secured.

Shafts 58 are journaled in bearings 60, mounted in casing 24 rigidly secured on hub 6 of the secondary propeller by screws 61.

The various pinions 59 engage the internal teeth 62 of ring gear 21 centered and guided, as heretofore disclosed, by rollers 22, said ring gear 21 comprising integrally other internal teeth 63. Another ring gear 64 with internal teeth 65 is rigid by means of bolts 66 with casing 24, that is to say rigidly connected with secondary shaft 5.

Teeth 63 and 65 of ring gears 21 and 64 respectively engage planet pinions 32a and 33a mounted in a manner similar to that heretofore disclosed for pinions 32 and 33. Said planet pinions 32a and 33a are journaled in a planet pinion carrier 36a loosely mounted and they respectively mesh with the external teeth 40a and 41a of ring gears 42a and 43a. Ring gear 42a is secured, by screws 44a to a ring 68 keyed on primary shaft 1. Ring gear 43a is loosely mounted and its teeth 41a also engage teeth 46a of a ring gear 47a comprising integrally external teeth 48a continually engaged with pinions 49a rigidly secured on shafts 50a. Each shaft 50a which is journaled in the corresponding hub socket 3 has a part 51a forming a worm to control the worm wheel 52a rigidly secured on the root 4 of the corresponding blade.

In position for normal operation, without pitch variation, the electric motor being stopped, shafts 50 of the secondary propeller are prevented from rotating, therefore pinions 59 do not rotate. Said pinions 59 with ring gear 21 and ring gear 64 are driven by casing 24 rigidly secured on the hub of the secondary propeller without that any relative displacement of the members with respect to each other may take place.

As in the device controlling the pitch variation of the secondary propeller, teeth 63 and 65 of ring gears 21 and 64 are equal in number. Likewise, planet pinions 32a and 33a are similar and teeth 40a and 41a of ring gears 42a and 43a are also similar. In these conditions, the revolving displacements of planet pinions 32a and 33a are identical so that no pitch variation is produced.

On the contrary, when shafts 50 are angularly moved to vary the pitch of the secondary propeller, said angular displacement is transmitted, by shafts 56 and pinions 59 to ring gear 21 the internal teeth 62 of which are engaged with said pinions 59. A relative angular displacement between ring gears 21 and 64 is then produced and, by means of planet pinions 32a and 33a, a relative angular displacement between ring gears 42a and 41a is produced. In these conditions, ring gear 41a transmits its relative angular displacement, by means of ring gear 47a, to pinions 49a controlling worms 51a engaging worm wheels 52a in order to vary the pitch of the primary propeller.

The control previously described, for obtaining the simultaneous change of pitch of two coaxial propellers rotating in reverse directions, can apply equally to double propellers controlled either by one engine, or by two different engines. In fact, the rotation speeds of the shafts of both propellers can be similar or different, or without thereby affecting the incidence of the blades.

In these conditions, a single electric motor such as 9 simultaneously operates the pitch controlling mechanism of both propellers.

It will be noted that the control by means of planet pinions for the primary propeller is similar to that used for the secondary propeller. This control can, in principle, be of any type, and use can be made for that purpose, of all known devices currently used for varying the pitch of a single propeller.

It is obvious that the embodiment heretofore described and illustrated is only given herein by way of indication and not in a limiting sense. All modifications or changes which do not alter in any way the main features set forth or the desired result, remain included in the scope of the present invention.

What we claim as our invention and desire to secure by Letters Patent is:

1. In an aircraft propeller mechanism having two coaxial propeller hubs rotating in reverse directions, a primary shaft, a front hub rigidly secured on said primary shaft, primary radial sockets provided round said front hub, with primary propeller blades in each socket said blades having their roots rotatable in bearings in said primary sockets, primary worm wheels rigidly secured on said roots, primary worms for engaging said primary worm wheels, a secondary tubular shaft surrounding the rear free part of said primary shaft, a rear hub rigidly secured on said secondary tubular shaft, secondary radial sockets provided round said rear hub, with secondary propeller blades in each socket said blades having their roots rotatable in bearings in said secondary sockets, secondary worm wheels rigidly secured on said roots, secondary worms provided with extensions and adapted to engage said secondary worm wheels, a stationary casing, an electric motor supported by said stationary casing having a driven shaft extending inwardly the same and a driving pinion keyed on said shaft, a spur wheel located in said stationary casing adapted to be permanently engaged with said driving pinion, a secondary pinion integral with said spur wheel, a shaft for rotating said spur wheel and said secondary pinion, ball bearings located in said stationary casing for bearing said shaft, a movable casing rigidly fitted on said rear hub and adapted to support said extensions, primary pinions rigidly secured on said extensions inwardly said movable casing, a secondary rear ring gear comprising integrally external and internal teeth and a race and adapted to engage said secondary pinion through its external teeth, a loose rear pinion adapted to engage the external teeth of said secondary rear ring gear, a loose front pinion integral with said loose rear pinion having teeth different from the teeth of the said loose rear pinion, a secondary front ring gear comprising integrally external and internal teeth and a race and adapted to engage said loose front pinion through its external teeth, a primary rear ring gear comprising integrally front and rear external teeth and a race and adapted to engage said primary pinions through its rear external teeth, rollers adapted to roll on said races respectively, shafts rigidly secured on said casings for rotating said rollers respectively, a front ring gear rigidly fitted on said movable casing and having internal teeth, planet pinion carriers loosely mounted, front and rear planet pinions on said planet pinion carriers adapted to engage the internal teeth of said front and rear ring gears respectively, a secondary rear externally toothed gear rigidly secured on said secondary tubular shaft and adapted to engage said rear planet pinions, a primary rear externally toothed gear rigidly secured on said primary shaft and adapted to engage said rear planet pinions, front externally toothed gears loosely mounted and adapted to engage respectively said front planet pinions, worm actuating ring gears comprising integrally external and internal teeth adapted to engage respectively said front loose gears through their internal teeth, worm actuating pinions for engaging permanently the external teeth of said worm actuating ring gears respectively, secondary worm shafts integral with said secondary worms supported by said secondary sockets and adapted to fix said secondary worm actuating pinions and primary worm shafts integral with said primary worms on said roots, secondary worms provided with forwardly extensions and adapted to engage said secondary worm wheels, a stationary casing, an electric motor supported by said stationary casing having a driven shaft extending inwardly the same and a driving pinion keyed on said shaft, a spur wheel located in said stationary casing adapted to be permanently engaged with said driving pinion, a secondary pinion integral with said spur wheel, a shaft for rotating said spur wheel and said secondary pinion, ball bearings located in said stationary casing for bearing said shaft, a movable casing rigidly fitted on said rear hub and adapted to support said extension, primary pinions rigidly secured on said extensions inwardly said movable casing, a secondary rear ring gear comprising integrally external and internal teeth and a race and adapted to engage said secondary pinion through its external teeth, a loose rear pinion adapted to engage the external teeth of said secondary rear ring gear, a loose front pinion integral with said loose rear pinion having teeth different from the teeth of the said loose rear pinion, a secondary front ring gear comprising integrally external and internal teeth and a race and adapted to engage said loose front pinion through its external teeth, a primary rear ring gear comprising integrally front and rear external teeth and a race and adapted to engage said primary pinions through its rear external teeth, shafts rigidly secured on said casings for rotating said rollers respectively, rollers adapted to roll on said races, respectively, a front ring gear rigidly fitted on said movable casing and having internal teeth, planet pinion carriers loosely mounted, front and rear planet pinions on said planet pinion carriers adapted to engage the internal teeth of said front and rear ring gears, respectively, a secondary rear externally toothed gear rigidly secured on said secondary tubular shaft and adapted to engage said rear planet pinions, a primary rear externally toothed gear rigidly secured on said primary shaft and adapted to engage said rear planet pinions, front externally toothed gears loosely mounted and adapted to engage respectively said front planet pinions, worm actuating ring gears comprising integrally external and internal teeth adapted to engage respectively said front loose gears through their internal teeth, worm actuating pinions for engaging permanently the external teeth of said worm actuating ring gears, respectively, secondary worm shafts integral with said secondary worms supported by said secondary sockets and adapted to fix said secondary worm actuating pinions and primary worm shafts integral with said primary worms supported by said primary socket and adapted to fix said worm actuating pinions.

2. An aircraft propeller mechanism having two rotating coaxial propeller hubs in reverse directions and comprising a primary shaft, a front hub rigidly secured on said primary shaft, primary rotatable propeller blades on said front hub, primary worm-gearings for operating said primary blades in rotation, a secondary tubular shaft surrounding the rear free part of said primary shaft, a rear hub rigidly secured on said secondary shaft, secondary rotatable propeller blades on said rear hub, secondary worm-gearings for operating said secondary blades in rotation, a primary mechanism for actuating said primary worm gearings, means integral with said secondary worm-gearings adapted to actuate said primary mechanism, a secondary mechanism comprising two elements the relative displacements of which are adapted to operate said secondary worm-gearings and operative means adapted to control the relative displacement between said two elements and comprising a stationary casing, an electric motor supported by said casing having a driven shaft extending inwardly the same and a driving pinion keyed on said shaft for controlling said secondary mechanism.

3. An aircraft propeller mechanism having two coaxial propeller hubs rotating in reverse directions and comprising a primary shaft, a front hub rigidly secured on said primary shaft, primary radial sockets provided round said front hub, primary propeller blades in each of said sockets said blades having their roots rotatable in said primary sockets, primary worm wheels rigidly secured on said roots, primary worms for engaging said primary worm wheels, a secondary tubular shaft surrounding the rear free part of said primary shaft, a rear hub rigidly secured on said secondary tubular shaft, secondary radial sockets provided round said rear hub, secondary propeller blades provided in each of said sockets said blades having their roots rotatable in said secondary sockets, secondary worm wheels rigidly secured on said roots, secondary worms adapted to engage said secondary worm wheels, a primary planet pinion device for actuating said primary worms, extensions integral with said secondary worms and adapted to actuate said primary planet pinion device, a secondary planet pinion device comprising two gears the teeth of which are different in number so as to obtain between them a relative displacement adapted to actuate said secondary worms, and operative means adapted to control the relative displacement between said gears and comprising a stationary casing, an electric motor supported by said casing having a driven shaft extending inwardly the same and a driving pinion keyed on said shaft for controlling said secondary planet pinion device.

4. An aircraft propeller mechanism, according to claim 3, wherein said secondary planet pinion device comprises a stationary casing, a spur wheel located in said casing adapted to be permanently engaged with said operative means, a pinion integral with said spur wheel, a shaft for rotating said spur wheel and said pinion, ball bearings located in said casing for bearing said shaft, a rear ring gear comprising integrally external and internal teeth and a race and adapted to engage said pinion through its external teeth, a loose rear pinion adapted to engage the external teeth of said rear ring gear, a loose front pinion integral with said loose rear pinion the teeth of which are different in number from the teeth of the same, a front ring gear comprising integrally external and internal teeth and a race and adapted to engage said loose front pinion through its external teeth, front and rear rollers adapted to roll respectively on said front and rear races, shafts rigidly fitted on said casing for rotating said rollers, a planet pinion carrier loosely mounted, front and rear planet pinions on said planet pinion carrier adapted to engage the internal teeth of said planet and rear ring gear respectively, a rear externally toothed gear rigidly secured on said secondary tubular shaft and adapted to engage said rear planet pinions, a front externally toothed gear loosely mounted and adapted to engage said front planet pinions, a worm actuating ring gear comprising integrally external and internal teeth adapted to engage said front loose gear through its internal teeth, worm actuating pinions for engaging permanently the external teeth of said worm actuating ring gear and secondary worm shafts integral with said secondary worms supported by said secondary sockets and adapted to fix said worm actuating pinions.

5. An aircraft propeller mechanism, according to claim 3, wherein said primary planet pinions device comprises a casing rigidly fitted on said rear hub and adapted to support said extensions, pinions rigidly secured on said extensions inwardly said casing, a rear ring gear comprising integrally front and rear external teeth and a race and adapted to engage said pinions through its rear external teeth, rollers adapted to roll on said race, shafts rigidly secured on said casing adapted to rotate said rollers, a front ring gear rigidly fitted on said casing and having internal teeth, a planet pinion carrier loosely mounted, front and rear planet pinions on said planet pinion carrier adapted to engage the internal teeth of said front and rear ring gear respectively, a rear externally toothed gear rigidly secured on said primary shaft and adapted to engage said rear planet pinions, a front externally toothed gear loosely mounted and adapted to engage said front planet pinions, a worm actuating ring gear comprising integrally external and internal teeth adapted to engage said front loose gear through its internal teeth, worm actuating pinions for engaging permanently the external teeth of said worm actuating ring gear and primary worm shafts integral with said primary worms supported by said primary sockets and adapted to fix said worm actuating pinions.

PIERRE PAUL RATIÉ, so-called RATIER.
RENÉ JEAN RATIÉ, so-called RATIER.

REFERENCES CITED

The following references are of record in the file of this patent:

UNITED STATES PATENTS

| Number | Name | Date |
|---|---|---|
| 2,338,420 | Freitage | Jan. 4, 1944 |
| 2,367,230 | McCoy | Jan. 16, 1945 |
| 2,389,161 | McCoy | Nov. 20, 1945 |
| 2,394,299 | Friedrick | Feb. 5, 1946 |

FOREIGN PATENTS

| Number | Country | Date |
|---|---|---|
| 483,760 | Great Britain | Apr. 26, 1938 |